(12) United States Patent
Rahman et al.

(10) Patent No.: US 7,042,851 B1
(45) Date of Patent: May 9, 2006

(54) SERVICE CREATION AND NEGOTIATION IN A WIRELESS NETWORK

(75) Inventors: Mohamed Anisur Rahman, Mendham, NJ (US); Bruce M. LaBombard, Chatham, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 926 days.

(21) Appl. No.: 09/695,921

(22) Filed: Oct. 26, 2000

(51) Int. Cl.
H04L 12/26 (2006.01)
H04Q 7/24 (2006.01)
G06F 15/16 (2006.01)

(52) U.S. Cl. ............... 370/259; 370/338; 370/352; 379/88.17; 379/201.01; 455/414.3; 455/432.3; 455/433; 709/226

(58) Field of Classification Search .......... 370/252, 370/254, 259, 310, 328, 329, 338, 352; 379/88.17, 379/93.01, 201.01–201.03, 201.12; 455/403, 455/412.1, 412.2, 414.1–414.3, 432.1, 432.3, 455/433, 435.1; 707/1, 3, 10; 709/201, 709/203, 217, 218, 219, 223, 225, 226, 229
See application file for complete search history.

(56) References Cited

U.S. PATENT DOCUMENTS

| | | | |
|---|---|---|---|
| 4,714,989 A * | 12/1987 | Billings ................... 707/10 |
| 5,721,908 A * | 2/1998 | Lagarde et al. ........... 707/10 |
| 5,793,964 A * | 8/1998 | Rogers et al. ............ 709/202 |
| 5,940,759 A * | 8/1999 | Lopez-Torres et al. .... 455/433 |
| 5,941,947 A * | 8/1999 | Brown et al. ............. 709/225 |
| 6,002,941 A * | 12/1999 | Ablay et al. .............. 455/518 |
| 6,035,339 A * | 3/2000 | Agraharam et al. ....... 709/246 |
| 6,044,264 A * | 3/2000 | Huotari et al. ........... 455/414.1 |
| 6,088,435 A * | 7/2000 | Barber et al. ............ 379/205.01 |
| 6,181,927 B1 * | 1/2001 | Welling et al. .......... 455/414.1 |
| 6,205,478 B1 * | 3/2001 | Sugano et al. ............ 709/223 |
| 6,351,646 B1 * | 2/2002 | Jellema et al. ............ 455/461 |
| 6,401,085 B1 * | 6/2002 | Gershman et al. ............ 707/4 |
| 6,430,276 B1 * | 8/2002 | Bouvier et al. ........ 379/121.01 |
| 6,549,768 B1 * | 4/2003 | Fraccaroli ................ 455/456.3 |
| 6,574,323 B1 * | 6/2003 | Manuel et al. ........ 379/207.02 |
| 6,603,761 B1 * | 8/2003 | Wang et al. ................ 370/352 |
| 6,622,016 B1 * | 9/2003 | Sladek et al. ......... 379/201.01 |
| 6,625,274 B1 * | 9/2003 | Hoffpauir et al. ........... 379/229 |
| 6,751,657 B1 * | 6/2004 | Zothner ..................... 709/220 |
| 2002/0002596 A1 * | 1/2002 | Sugiarto et al. ........... 709/218 |
| 2002/0160748 A1 * | 10/2002 | Rahman et al. ............ 455/406 |
| 2003/0211845 A1 * | 11/2003 | Lohtia et al. ............ 455/414.3 |

FOREIGN PATENT DOCUMENTS

| WO | WO 9741654 A1 * | 11/1997 |
|---|---|---|
| WO | WO 9933293 A1 * | 7/1999 |

OTHER PUBLICATIONS

Christer Erlandson, Per Ocklind, WAP—The wireless application protocol, Ericsson Review No. 4, 1998, Ericsson, http://www.ericsson.com/about/publications/review/1998_04/5.shtml.*

* cited by examiner

*Primary Examiner*—Alpus H. Hsu

(57) ABSTRACT

A system and method employing a processing node having storage capabilities for facilitating service creation and negotiation in a wireless network, by associating user information and/or service information with network information. User information, service information, and network information are provided periodically and dynamically into the storage. Using the processing node, user information and/or service information are associated with network information without having to access various network elements located throughout the network, to facilitate service creation and negotiation, and thus minimize network processing and network resources.

27 Claims, 2 Drawing Sheets

SERVICE CREATION AND NEGOTIATION IN A WIRELESS NETWORK

FIELD OF THE INVENTION

The present invention relates to a system and method of storing and associating user information, service information, and network information to improve service creation and negotiation in a wireless network.

BACKGROUND OF THE INVENTION

The creation and negotiation of services, such as data services, requires the extensive processing of user and/or service information along with network information. Service creation generally refers to the processing performed when the user requests a new service. Service negotiation generally refers to the processing performed when the user modifies a currently subscribed to service. Service creation and negotiation both involve an analysis of user information to determine if a particular user can be provided with the requested service, an analysis of service information to determine if the requested service can be provided to the particular user, and an analysis of network information, such as network resources, to determine if the network is able to support the providing of the requested service to the particular user. An exemplary conventional system and method of service creation and negotiation will be explained hereinafter.

FIG. 1 depicts an example of a conventional wireless network 1. A mobile station (MS) 2 is in communication with at least one base station (BS) 5. A base station 5 has multiple transceivers controlled by a base station controller (BSC) 10. The BSC 10 manages the radio channels and underlying hardware resources of all the base stations 5 under its control, and coordinates the activities of the SDU 22 and the base stations 5 during setup, release, and handoff of radio channels for different service configurations. Each base station 5 is in communication with a mobile station controller (MSC) 40 to establish and maintain communications between the mobile station 2 and the wireless network 1. The MSC 40 being responsible for, among other things, call and/or connection control and mobility management. The BSC 10 is in communication with an Asynchronous Transfer Mode (ATM) network 20 having a selection distribution unit (SDU) 22 therein, whereby additional traffic channel assignment functionality are also handled by the BSC 10. An Internet/Packet Data Network 30 is connected with the ATM network 20 via a data content analysis/interworking function (DA/IWF) module 25. Asynchronous Transfer Mode (ATM) is a network technology based on transferring data in packets of a fixed size. The packet size in an ATM network is smaller than those of older network technologies, allowing the transmittal of video, audio and other data over the same network while no single data type dominates a network communication line. The DA/IWF module 25 is an intermediary between the ATM network 20 and the Internet/Packet Data Network 30, providing users with, for example, packet data services. The data content analysis (DA) determines the data characteristics and its content such as the byte size of images, and how an image is quantized in the pixel or frequency domain. The data content analysis (DA) may consist of a number of possible transformations, decoding techniques or protocol conforming techniques to determine the type and possible content of the data.

A Web server 32, and other Web based interfaces, such as a computer workstation 34, are operatively connected with the Internet/Packet Data Network 30 to allow communication therebetween. The MSC 40 is operatively connected with the ATM network 20; the MSC 40 being responsible for, among other things, establishing and maintaining calls between the mobile stations 2 and calls between a mobile station 2 and a wireline station 50. A wireline station 50 is operatively connected to the MSC 40 via a public switched telephone network (PSTN) 45, so that communication between mobile stations 2, wireline stations 50 and the wireless network 1 can be established.

A home location register (HLR) 70 for supporting applications and services is connected with a Web server 66 for communicating Web-based data therebetween. The HLR 70 is used to support the MSC 40, and assists in providing mobility management and enhanced service features by storing user information, such as the user profile which may list the services subscribed to by the user. The HLR 70 is also connected with the DA/IWF module 25 to allow communication of user information therebetween. Also, the HLR 70 is connected with the BSC 10 to coordinate the user's request from the mobile station 2 with the user information stored in the HLR 70.

In the conventional art, certain portions of the network contain user information, some other network elements contain service information, and different portions of the network contain the network's information and capabilities.

User information generally refers to specific aspects pertaining to a particular user. Examples of user information include, user profiles (e.g., user name, billing address, location, services currently subscribed to, etc.), user preferences based on how services should be provided (e.g., time of day when certain services should be received, receiving certain services only when in a particular geographical location, etc.), etc. In general, user information are stored in the HLR 70.

Service information generally refers to information for providing services and specific information about the services, based on the capabilities (such as bandwidth) required by each service to function properly. Examples of service information include, available services (e.g., voice transmissions, data transmissions such as information services, messaging, scheduling, etc.), available service options such as selectable levels of service quality (e.g., service quality based on signal-to-noise ratios, bit-error rates, etc.), etc. Service information are stored in several locations, such as in the HLR 70, the MSC 40, the BSC 10, etc. For example, the available service information may reside in the HLR 70, while the service capabilities and options may reside in the MSC 40 and the BSC 10.

Network information generally refers to information for network processing. Network information can be user-based or cell-based. User-based network information includes, e.g., network capacity based on the total number of current users, etc. Cell-based network information includes, e.g., network signal interference based on available bandwidth, available network resources required for services, available network resources for a particular cell, etc. Network information are stored in and accessed from different portions of the network, such as, the ATM network 20, the DA/IWF module 25, the BSC 10, etc. In the conventional art, the HLR 70 contains no network information.

An exemplary conventional method of service creation and negotiation may begin with the user deciding to newly receive a certain type of data service, such as getting stock quotes. For example, say a user who travels extensively in New York and Boston wishes to always receive stock quotes at 12 noon each day while being in either city. The user would place his request to receive stock quotes in the above manner using his mobile station 2. The mobile station 2 communicates with the base station 5, and the BSC 10 receives the request from the base station 5. The BSC 10 then communicates with the HLR 70 to store the user request and obtain previously stored user information (user profile, user preferences, etc.) therein.

The ATM network 20 accesses via for example, the BSC 10, user information stored in the HLR 70 and notes that the user wants stock quotes every day at 12 noon in New York or Boston. The ATM network 20 communicates with the DA/IWF module 25, the MSC 40, the BSC 10 etc., in order to access various service information (service bandwidth requirements, service options, etc.). For example, the service bandwidth requirements for providing stock quotes to the user at 12 noon each day in New York and Boston is verified. It may be found that if the user requests his stock quotes when in New York, the service needs to be provided at a particular service bandwidth, while the service requires a different service bandwidth when the user is in Boston.

The ATM network 20 further communicates with the DA/IWF module 25, the MSC 40, the BSC 10 etc., to access network information (available network resources, network support capabilities such as network traffic, signal interference caused in certain wireless network cells due to a large number of existing users accessing the network, etc.) for providing the user with stock quotes at 12 noon in New York and Boston. For example, the network information may indicate that the anticipated network traffic at the user requested 12 noon time period in New York will be extremely heavy, while the anticipated network traffic at 12 noon in Boston will be light.

In this manner, user information and/or service information (accessed and obtained from various network elements) are compared with network information (accessed and obtained from various network elements) to see if the newly requested service can be performed so that the service can be supported and provided to the user. For each user and for each service request, the ATM network 20, the DA/IWF module 25, the BSC 10, etc. cooperate to determine whether the network capabilities can allow the user to get the requested service. For example, if there are currently too many users on the network who have requested stock quotes or if there is a limit on the number of permitted users to receive stock quotes, the user will be informed that the network is at full capacity and asks the user to attempt access at another time.

If the user and service information and the network capabilities are such that the requested stock quote information can be provided to the user, the network processing proceeds to access stock quote data. If, for example, the stock quotes are to be provided by a financial news organization having a Web server 32, the DA/IWF module 25 further communicates with the Internet/Packet Data Network 30 to receive stock quote data from the Web server 32.

Like service creation, the user's request to modify (i.e., negotiate) a currently subscribed service is performed in a similar manner. For example, say the user currently subscribing to the previously established service of receiving stock quotes every day at 12 noon in New York or Boston wishes to modify this service so that he gets his stock quotes at 1 pm instead.

Service negotiation will be begin upon the user placing a request via, for example, his mobile station 2. As with the process for service creation, the mobile station 2 communicates with the base station 5, and the BSC 10 receives the request from the base station 5. The BSC 10 then communicates with the HLR 70 to store the user request and obtain previously stored user information. The ATM network 20 accesses user information stored in the HLR 70 and notes that the user wants stock quotes every day at 1 pm in New York or Boston. The ATM network 20 communicates with the DA/IWF module 25, the MSC 40, the BSC 10 etc., in order to access various service information (such as service bandwidth requirements) for providing stock quotes at 1 pm in New York or Boston. The ATM network 20 further communicates with the DA/IWF module 25, the MSC 40, the BSC 10 etc., to access network information for providing stock quotes at 1 pm in New York or Boston. The various elements of the communications network, such as the base station 5, the BSC 10, the ATM network 20, the HLR 70, the DA/IWF module 25 and the MSC 40 all cooperate with one another to obtain the necessary user and/or service information and network information to determine whether the user can negotiate (modify) his current stock quote service to be received at 1 pm instead of 12 noon.

As can be understood by those skilled in the art, receiving stock quotes is only one type of service that the user may request or negotiate through the wireless network. A multitude of other services can be provided as well.

Thus, network information, in addition to user and/or service information, are required to determine whether the user's desired modifications to his stock quote service can be negotiated between the user and the network. In this manner, services created or negotiated requires the separate accessing and separate processing of user and/or service information and network information stored in various locations of the network on a per user basis or per call basis.

SUMMARY OF THE INVENTION

A system and method in accordance with the present invention facilitates service creation and negotiation in a wireless network by, in one embodiment, establishing storage capabilities in the wireless network for storing network information and user information, and in response to a request from a user to create or negotiate a service, accessing network information and user information; comparing the requests with network information and user information; and providing the requested service based upon the comparison. In a preferred embodiment, the comparing of the request with network and user information involves "associating" user information with network information. Associating means the establishing of a relationship between at least two different parameters or the logically linking of at least two different parameters. For example, for a particular user location (user information), the available network resources (network information) for the user at that particular user location is obtained and accessed so that user information and network information are "associated" to have a dependent relationship therebetween. In other words, particular user information is dependent with particular network information such that a logical link exists therebetween.

Service information may be additional employed to facilitate service creation and negotiation, wherein user information and/or service information are associated with network information by the processing node. User information, service information and network information are provided into the storage of the processing node, periodically (e.g., stored at certain intervals of time) and dynamically (e.g., updating based on changing network operating environment conditions).

User information generally refers to specific aspects pertaining to a particular user. Examples of user information include, user profiles (e.g., user name, billing address, location, services currently subscribed to, etc.), user preferences based on how services should be provided (e.g., time of day when certain services should be recieved, receiving certain services only when in a particular geographical location, etc.), etc.

Service information generally refers to information available to service providers for providing services and specific information about the services themselves. Examples of service information include, available services and their specifics (e.g., voice transmissions, data transmissions such as information services, messaging, scheduling, etc.), available service options such as selectable levels of service quality (e.g., service quality based on signal-to-noise ratios, bit-error rates, etc.), etc.

Network information generally refers to information for network processing. Examples of network information include, available network resources required for services, network capacity, network traffic, network signal interference, etc.

In accordance with the present invention, user information and/or service information are associated with network information without having to access various network elements located throughout the network, to facilitate service creation and negotiation, and thus minimize network processing and network resources.

BRIEF DESCRIPTION OF THE DRAWINGS

The present invention will become more fully understood from the detailed description given hereinbelow and from the accompanying drawings, which are given by illustration only, and thus are not limitative of the present invention.

DETAILED DESCRIPTION OF THE PREFERRED EMBODIMENTS

The present invention is, in part, recognizing the problems of the conventional system and method of service creation and negotiation requiring separate processing for accessing different elements of the network, and associating user and/or service information with network capabilities for each type of service to be created and/or negotiated for each service on a per user basis or per call basis.

For each service request, the conventional network processing of verifying the user and service information with the network capabilities needs to be performed differently, as different information are stored in different portions of the network. For example, the network processing for negotiating sports scores need not go through the Internet/Packet Data Network 30 if the sports scores are provided through non-Web-based methods, such as Over the Air Activation Service Provisioning (OTASP). This differs from the network processing and network elements used in, for example, getting stock quotes provided from a Web server, which requires Web-based network processing via the Internet/Packet Data Network 30.

The network service provider needs to coordinate and access these different portions of the network each time a user creates or negotiates a service in order to obtain and compare user and service information with network information. Wireless service providers are overwhelmed in trying to meet consumer demands. The need to provide large amounts of data, such as Web-based content, to users who wish to create and negotiate services only increases these difficulties. Furthermore, in the conventional art, the user will only be informed whether his requested service can be provided after the various network elements complete the verification process of comparing user and/or service information with the network information for each type of service.

Thus, the present inventors recognized a need to improve the processing of service configuration and negotiation so that services can be created and/or negotiated by the user without requiring separate excessive processing of each type of service to be created or negotiated. To achieve this, a processing node with storage capabilities is employed in accordance with the present invention to advantageously minimize network processing and network resources. Employing the present invention alleviates the burdens on network processing resources because all information regarding the user and/or service and the network are easily accessible from and updated into one place, i.e., the processing node, and multiple service requests can also be easily handled by the processing node, whereas the conventional art required network processing to be performed separately for each service request.

Wireless Network Architecture

Figure 1:
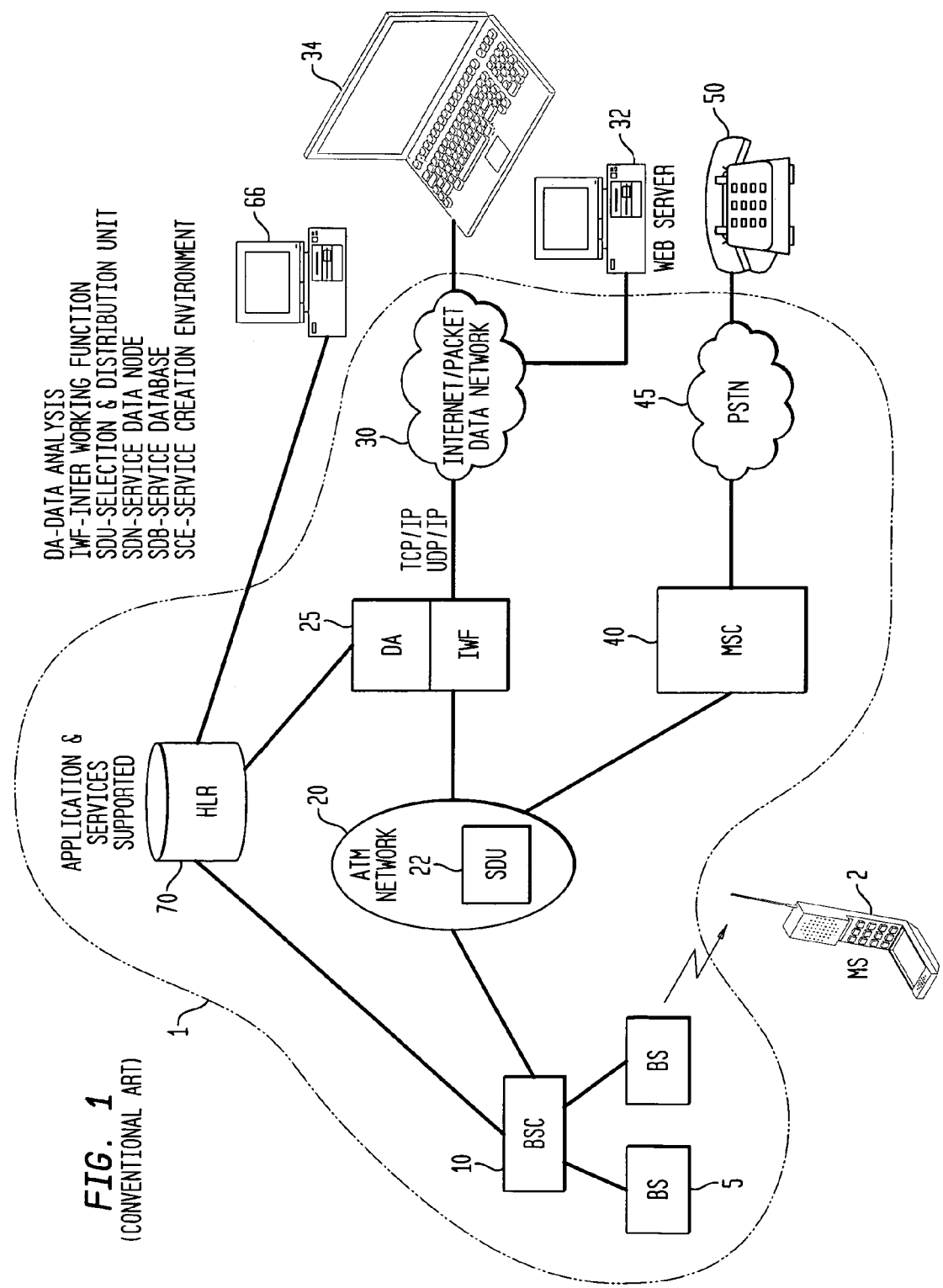
FIG. 1 is a diagram of an illustrative system for a wireless service provider network in accordance with the conventional art.
Figure 2:
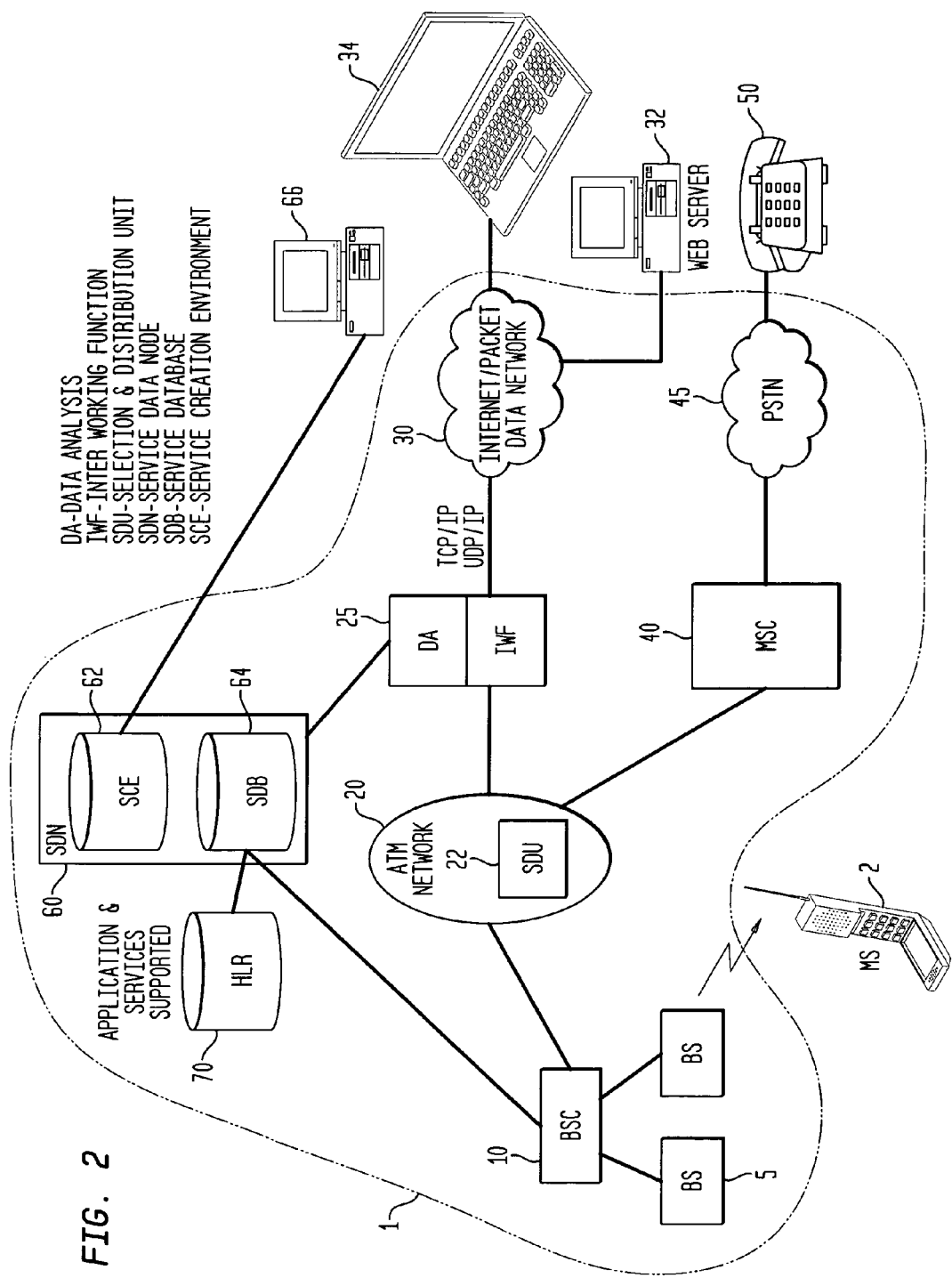
FIG. 2 is a diagram of an illustrative system for a wireless service provider network in accordance with an embodiment of the present invention.

FIG. 2 illustrates a wireless network in accordance with a preferred embodiment of the present invention. All network components are the same as those in the conventional art wireless network shown in FIG. 1, with the exception of a service data node (SDN) 60 and elements associated thereto. Accordingly, like reference numerals have been used to designate like components and the description thereof will not be repeated for the sake of brevity.

The SDN 60 comprises a service creation environment (SCE) 62 and a service database (SDB) 64. The SDN 60 is connected with various network elements, such as, the ATM network 20 and the DA/IWF module 25. The SDN 60 processes and "associates" user and/or service information with network information without having to access various elements located throughout the network, to facilitate service creation and negotiation, and thus minimize network processing and network resources. Here, "associates" means the establishing of a relationship between at least two different parameters or the logically linking of at least two different parameters. For example, for a particular user location (user information), the available network resources (network information) for the user at that particular user location is obtained and accessed so that user information and network information are "associated" to have a dependent relationship therebetween. In other words, particular user information is dependent with particular network information such that a logical link exists therebetween.

According to a preferred embodiment, network and service information are stored in the SCE 62, while user and service information is stored in the SDB 64.

Depending upon the particular implementation methods and elements used in the network, a plurality of service data nodes (SDN) 60 may be employed in order to accommodate the size of the network and/or the number of subscribers/users of the network. One skilled in the art would understand that the enabling descriptions above regarding the implementation of one SDN 60 in the network, can also be applied when implementing a plurality of SDNs 60 in the network.

Information Databases

In a preferred embodiment, network and service information are stored in the SCE 62, while user and service information is stored in the SDB 64. The SCE 62 is connected with the Web server 66 and accessed by the user via, for example, a mobile station 2. Network information is stored into the SCE 62 by the service provider via network elements, such as, the ATM network 20, the DA/IWF module 25, the Web server 66, etc. The SDB 64, connected with the BSC 10 and the HLR 70, stores user information, such as, information regarding the wireless network cell location in which the user presently resides in. Service information from the BSC 10 are stored in the SDB 64 as well. The SCE 62 and the SDB 64 can be updated periodically (e.g., after certain intervals of time) and/or dynamically (e.g., updating based on changing network operating environment conditions) to store user, service and network information therein.

In the conventional art, various user, service and network information are stored at different portions of the wireless network, independently and/or unlinked with one another. For example, as well known in the conventional art, the HLR 70 only has user information (e.g., user profiles, user preferences, etc.) stored therein, while various portions of the network, such as in the HLR 70, the MSC 40, the BSC 10, etc. contain different service information (e.g., available services, service options, etc.) and network information (e.g., available network resources required for services, network capacity, network traffic, network signal interference, network protocols, etc.).

An embodiment of the present invention employs a processing node, i.e., a storage data node (SDN) 60 with SCE 62 and SDB 64, to dynamically store and allow access to user, service and network information. For example, Web-based network information are stored into the SCE 62. Web-based information include, for example, image processing techniques, Web proxy data, etc. Other well-known wireless network information, such as data transfer information including data packet burst control functions, are stored in the SDB 64. Additionally, the SDB 64 stores the necessary user information to determine whether the user can receive the requested service; the user information being obtained from the HLR 70. In this manner, various user, service and network information are dynamically stored, in for example, the SCE 62 and the SDB 64, so that the user's request to create or modify a service can be verified by the SDN 60 in a simple manner by accessing the SCE 62 and the SDB 64, instead of having to obtain the user, service and network information from various, independent, and/or unlinked sources within the network, each time a service creation or negotiation is performed.

The user, service and network information need to be dynamically and/or periodically stored and updated, because the user and service characteristics change, and the network environment varies with time. It will be appreciated based on the foregoing that the specific implementation methods used in updating and dynamic storing of user, service and network information into storage of the SDN 60 is a matter of design choice to achieve the desired dynamic storing of information.

The dynamic storing of network information coordinated through the SDN 60 by service provider prior to and during service creation and negotiation include the following operations. For example, the BSC 10 stores the information of the radio environment, the access technology used, i.e., a code-division multiple-access (CDMA), a time-division multiple-access (TDMA) or a global system for mobile communications (GSM) standard, etc., and the loading capacity (i.e., whether it can support additional users with data rate and quality of service desired) of the base station 5 of the user concerned. The base station 5 measures the radio environment and the load associated interference situation it creates. The BSC 10 sends network information, such as data transfer information including data packet burst control functions, periodically to the SDB 64. Other well-known Web-based network information, such as Web protocol data, etc., are sent periodically to the SCE 62 as well upon changing of the network environment. Based on the stored information, certain conventionally known mapping operations are performed for supporting various services known in the art, grades of services known in the art or quality of services known in the art. For example, as the user moves to a new cell, the service database information also needs to be updated based on the new cell.

The downstream data that are returned in response to a user Web browser or client request has certain characteristics, which need to be ascertained. The data content analysis performed by the DA/IWF module 25 involves processing steps well known in the art. Furthermore, transcoding proxies and efficient compression techniques well known in the art may be applied to the data content to offset any processing delays. Upon completing the above operations, the SCE 62 and the SDB 64 contain all the information needed for allowing users to create or negotiate a service.

In accordance with the present invention, the SCE 62 and the SDB 64 are not necessarily limited to being separate databases in one physical location of the network. Instead, the SCE 62 and the SDB 64 may be distributed databases located throughout the network. Although the distributed databases would require synchronization techniques so that the distributed databases are dependent and/or linked together, the user configurable system and method according to the present invention employing a service data node processes services creation and negotiation in a more efficient manner. An example of achieving distributed databases to be dependent and/or linked together according to the present invention, is by "associating" (e.g., establishing a relationship or logically linking) user and/or service information with network information. User information is stored in the SDN 60 and network information pertaining to (i.e., associated with) that particular user information is found and also stored in the SDN 60 or some other location. In addition to user information, service information associated (e.g., logically linked) with the user information or network information can also be stored and updated in the SDN 60 or some other location. A more detailed description of how user and/or service information are associated with network information will follow.

Operation of Service Data Node (SDN)

Unlike the conventional art, the present invention employs a network processing scheme with user and/or service information and network information being processed and stored in an easily accessible, logically connected manner. The present invention "associates" the user and/or service information with network information in a dependent and/or linked manner such that particular user and/or service information is linked with corresponding network information. The information needed to determine whether service could be provided for a particular service request made by a particular user can be determined in advance. As such, in response to a service request a determination as to whether the requested service can be provided can be made with a reduced number of network system requests for user, service and network information. Additionally, the amount of time required for making the determination and/or the required network processing of user, service and network information after the request can be reduced.

The general network processing involved in determining service creation and negotiation are all known in the art, but the present invention conveniently performs these processing steps via a processing node, i.e., the SDN 60. A method of service creation and negotiation using the SDN 60 according to a preferred embodiment of the present invention will now be described.

As with the example used to describe the background of the invention, the user may request a new service, such as getting stock quotes at 12 noon when the user is in New York or Boston. For example, the user places his request via a mobile station 2 which communicates with the base station 5, and the BSC 10 receives the request from the base station 5. The BSC 10 then communicates with the SDN 60, in particular the SDB 64 therein. However, unlike the conventional art, prior to service creation (or service negotiation) initiated by the user, the SDB 64 has network information dynamically stored therein by various network elements, such as the ATM network 20, the DA/IWF module 25, etc. Network information is also dynamically stored into the SCE 62 from other network elements, such as a Web server 66 connected to the wireless network 1. Additionally, user information obtained from the HLR 70 containing the user's profile and other information about the user, are dynamically stored into the SDB 64 and used to determine whether the user can receive the requested stock quotes.

Upon receiving the user request, the SDN 60 proceeds to check its storage to locate the appropriate user information for the particular user making the service request. The user request of getting stock quotes at 12 noon when the user is in New York or Boston are stored into the user profile. Next, the SDN 60 proceeds to check its storage to locate the appropriate network information associated with the user and user request, instead of having numerous network elements check their own storage databases as in the conventional art. For example, the network information such as available network resources related to providing the particular user with stock quotes at 12 noon, and available network resources related to providing the user being in New York or Boston are accessed by the SDN 60 to determine whether the information requested by the user can be provided.

Additionally, the SDN 60 may proceed to check its storage to locate appropriate service information, such as available service resources. For example, the service bandwidth requirements for providing stock quotes to the user at 12 noon using the previously determined network resources are verified. Also, the service bandwidth requirements for providing stock quotes to the user each day in New York and Boston using the previously determined network resources are verified. It may be found that if the user requests his stock quotes when in New York, the service needs to be provided at a particular service bandwidth using certain network resources, while the service requires a different service bandwidth when the user is in Boston using certain other network resources. In this manner, the user and/or service information and their associated network information are accessed and compared by the SDN 60.

With the SDN 60 having network and service information stored in the SCE 62, while user and service information are stored in the SDB 64, the network processing is performed through accessing only the SDN 60, to thus quickly ascertain whether the requested service creation or negotiation can be provided. For example, the SDN 60 determines by comparing the information stored in the SCE 62 and the SDB 64, whether there are currently too many users on the network who have requested stock quotes at 12 noon or whether there is a limit on the number of permitted users to receive stock quotes in New York or in Boston. If the requested stock quotes cannot be provided, the user will be quickly informed that the network is at full capacity and asked to attempt access at another time.

If the SDN 60 determines the user and/or service information and the network capabilities are such that the requested stock quotes can be provided to the user, the network processing proceeds to access stock quote data using conventional techniques known to those skilled in the art. If the stock quotes are to be provided by a financial news organization having a Web server 32, the DA/IWF module 25 further communicates with the Internet/Packet Data Network 30 to receive stock quote data from the Web server 32. In this manner the processing involved in determining service creation are all known in the art, but the present invention performs these processing steps via accessing a central location, i.e., the SDN 60.

Thereafter, if the user wishes to modify (i.e., negotiate) the subscribed to stock quote service so that his quotes are received at 1 pm instead of 12 noon, the SDN 60 facilitates the processing involved by accessing its storage having user and/or service information and their associated network information in a manner similar to that described above for service creation. By associating various user and/or service information with network information, user, service and network information can be stored in a single location such as a database in the SDN 60 or physically distributed databases located throughout the network. As such, user and/or service information and network information are associated so that each type of information has some relationship with other types of information. Accordingly, different types of information are stored and updated in one or a plurality of physical locations, whereby the different types of information have a logically linked relationship.

The user's request to negotiate his currently subscribed service will be processed upon the user placing a request via, for example, his mobile station 2. As with the process for service creation according to the present invention employing the SDN 60, various elements of the communications network, such as the base station 5, the base station controller 10, the ATM network 20, the HLR 70, the DA/IWF module 25 and the MSC 40 all cooperate prior to user initiated service creation or service negotiation to store into the SCE 62 and the SDB 64 of the SDN 60, the necessary user and/or service information and information regarding the network capabilities. Thus, the SDN 60 compares network information and user and/or service information to determine whether the user's desired modifications to his service can be negotiated between the user and the network.

As can be understood by those skilled in the art, stock quotes and a multitude of other services can be provided to the user. However, unlike the conventional art, the network processing according to the present invention of verifying the user and/or service information and the network information is performed together at one time via the SDN 60, because different user and/or service information and network information are stored and accessed via the SDN 60 of the wireless network.

By using the SDN 60, the capabilities and request from a user in terms of qualities and services desired are compared with the network capabilities (information). A plurality of service processing nodes may be employed, requiring communication with the other service nodes for making sure that the capabilities are matched from end to end, as understood by those of ordinary skill in the art. For communicating with other service nodes, some existing protocols may be used or new protocols may be developed using techniques known in the art.

The above-described matching of network capabilities with user and/or service information to quickly determine if the user can create or negotiate a service helps in reducing call processing and signaling resources in a network, thus minimizing signal processing and the use of network resources. As the service creation and administration is automated via a processing node, the administrative and overhead expense involved for a service provider is reduced to a great extent, and a user can create his services without extensive network provider intervention.

This specification describes various illustrative embodiments of the method of the invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features which are consistent with the spirit and scope of the invention disclosed herein.

The invention claimed is:

1. A method of service creation and/or negotiation in a wireless network, comprising:
   receiving a request for service creation or negotiation;
   accessing a logically linked dynamic storage in accordance with the request without having to access any other portions of the network to minimize signal overloading;
   obtaining, from the storage, user information associated with the request;
   obtaining, from the storage, network information associated with the user information;
   comparing the request with the user information and the associated network information; and
   providing the requested service based on the comparison.

2. The method of claim 1, wherein the logically linked dynamic storage is dynamically updated in accordance with the user and network information.

3. The method of claim 1, wherein the step of providing the requested service is performed by accessing the logically linked dynamic storage.

4. A method of service creation and/or negotiation in a wireless network, comprising:
   receiving a request for service creation or negotiation;
   accessing a logically linked dynamic storage in accordance with the request without having to access any other portions of the network;
   obtaining, from the storage, service information associated with the request;
   obtaining, from the storage, user information associated with the service information;
   obtaining, from the storage, network information associated with the user information;
   comparing the service information and user information with the associated network information; and
   providing the requested service based on the comparison.

5. The method of claim 4, wherein the logically linked dynamic storage is dynamically updated in accordance with the user, service and network information.

6. The method of claim 4, wherein the step of providing the requested performed by accessing the logically linked dynamic storage.

7. A method of service creation and negotiation in a wireless network, comprising:
   receiving a request from a user to create or negotiate a service;
   accessing a storage having user information, service information and network information stored therein without having to access any other portions of the wireless network;
   comparing the request with the user information, the service information and the network information; and
   providing the data service to the user based upon the comparison.

8. The method of claim 7, further comprising:
   periodically obtaining user, service and network information; and
   dynamically updating the storage by periodically storing the periodically obtained user, service and network information.

9. The method of claim 8, wherein the dynamic storing includes storing network information into at least a first database.

10. The method of claim 9, wherein the dynamic storing includes storing user information into a second database.

11. A method of user configurable service creation and negotiation in a wireless network, comprising:
    receiving a request from a user to create or negotiate data services;
    accessing at least a first database having network information and user information stored therein without having to access any other portions of the wireless network;
    comparing the requests with the network information and the user information; and
    providing the data services to the user based upon the comparison.

12. The method of claim 11, further comprising a step of dynamically storing the network information and the user information into the first database, the network information being wireless network information.

13. The method of claim 12, further comprising a step of dynamically storing Web-based network information into a second database.

14. The method of claim 11, further comprising the step of periodically updating at least the first database with updated network and user information.

15. A system allowing service creation and negotiation in a wireless network, comprising:
    a receiver to receive a request from a user to create or negotiate a service; and
    a central processing node to process the request by comparing the request with user information, service information and network information dynamically stored therein without having to access any other portions of the wireless network, and to provide the requested service to the user based upon the comparison.

16. The system of claim 15, wherein the central processing node further comprises a first database having the network information dynamically stored therein.

17. The system of claim 16, wherein the central processing node further comprises a second database having the user information dynamically stored therein.

18. The system of claim 15, further comprising a first database having the network information dynamically stored therein.

19. The system of claim 18, further comprising a second database having the user information dynamically stored therein.

20. The system of claim 15, wherein the central processing node compares has been changed to—the network information and the user information.

21. The system of claim 15, wherein the central processing node periodically updates the network information and the user information.

22. A system allowing service creation and negotiation in a wireless network, comprising:
  at least a first database storing network information and user information; and
  a central processing node processing user requests by accessing the first database, comparing the requests with the network information and the user information dynamically stored in the first database without having to access any other portions of the wireless network, and providing the requested services to the users based upon the comparisons.

23. The system of claim 22, wherein the first database has the network information and the user information dynamically stored therein, the network information being wireless network information.

24. The system of claim 23, further comprising:
  a second database having Web-based network information dynamically stored therein; and wherein the central processing node compares the requests with the network information and the user information stored in the first and second databases.

25. The system of claim 22, wherein the central processing node periodically updates at least the first database with updated network and user information.

26. The system of claim 22, wherein the first database has a plurality of portions being physically distributed throughout the entire wireless network, the distributed portions being connectively linked with the central processing node.

27. The system of claim 22, wherein the central processing node includes the first database.

* * * * *